(12) United States Patent
Kosnik et al.

(10) Patent No.: US 7,232,240 B2
(45) Date of Patent: Jun. 19, 2007

(54) EXTENDED SOURCE LASER ILLUMINATOR

(75) Inventors: William D. Kosnik, San Antonio, TX (US); Brenda J. Novar, Cibolo, TX (US); Victor I. Villavicencio, Austin, TX (US)

(73) Assignee: Northrop Grumann Corporation, Los Angeles, CA (US)

( * ) Notice: Subject to any disclaimer, the term of this patent is extended or adjusted under 35 U.S.C. 154(b) by 47 days.

(21) Appl. No.: 11/123,085

(22) Filed: May 6, 2005

(65) Prior Publication Data

US 2007/0109784 A1    May 17, 2007

(51) Int. Cl.
*G02B 27/20* (2006.01)
(52) U.S. Cl. ............... 362/259; 362/558; 362/553; 89/1.11; 342/14
(58) Field of Classification Search ............... 362/259, 362/553, 558; 342/14; 89/1.11
See application file for complete search history.

(56) References Cited

U.S. PATENT DOCUMENTS

| 5,685,636 | A  | * | 11/1997 | German ............... 362/259 |
| 5,997,163 | A  |   | 12/1999 | Brown |
| 6,606,173 | B2 | * | 8/2003  | Kappel et al. ............ 359/15 |
| 6,870,650 | B2 |   | 3/2005  | Kappel et al. |
| 2004/0008392 | A1 | | 1/2004 | Kappel et al. |
| 2004/0130896 | A1 | | 7/2004 | Brown et al. |
| 2004/0184287 | A1 | * | 9/2004 | Smith et al. ............ 362/560 |

\* cited by examiner

*Primary Examiner*—Renee Luebke
*Assistant Examiner*—Jessica McMillan
(74) *Attorney, Agent, or Firm*—Andrews Kurth LLP

(57) ABSTRACT

An apparatus provides a safer, high brightness glare or illumination source. The apparatus comprises a laser to emit a light beam, and a magnifying telescope, including a negative lens to expand the light beam and a positive lens to collimate the expanded light beam. The apparatus also includes a holographic diffuser to receive the collimated light beam and to produce a diffused light beam. The diffused light beam has an extended cross section and provides an extended glare source at increased power down range.

23 Claims, 3 Drawing Sheets

EXTENDED SOURCE LASER ILLUMINATOR

The invention was made under a contract with an agency of the United States Government, contract number F41624-02-D-7003.

FIELD OF INVENTION

The present invention relates to laser illuminators. In particular, the present invention provides an extended source laser illuminator.

BACKGROUND OF THE INVENTION

Lasers are used in a myriad of industrial, medical, commercial, scientific and military applications. The advent of compact, battery-powered solid-state lasers has led to an interest in developing light-based non-lethal technologies (NLT) for law enforcement and military applications. Laser illuminators, capable of producing non-damaging high-brightness glare sources have applications in suspect apprehension, crowd control, perimeter defense, and intruder delay and denial. For example, laser illuminators provide an unequivocal warning to the adversary that his presence has been detected and may also impede mobility by degrading visual sensitivity. Effectiveness of laser illuminators has been limited by the inability to project sufficient light at a distance ("downrange") and, at the same time, to be eye safe at close range. Because of safety concerns, the power of lasers used in consumer applications often do not exceed a maximum permissible exposure.

The safety limitation of conventional illuminator designs is inherent in the point source nature of lasers. The conventional laser illuminators as well as common laser pointers emit a nearly collimated or parallel beam of light. When directed towards the human eye, a collimated beam may be focused to a point on the retina by the cornea and lens of the eye. Focusing causes the light energy to become extremely concentrated, greatly increasing the thermal damage potential of the light. The focused light can cause eye as well as skin damage.

SUMMARY OF THE INVENTION

An apparatus that provides a safer, high brightness glare source. The apparatus comprises a laser to emit a light beam, and a magnifying telescope, including a negative lens to expand the light beam and a positive lens to collimate the expanded light beam. The apparatus also includes a holographic diffuser to receive the collimated light beam and produces a diffused light beam. The diffused light beam has an expanded cross section and provides an extended glare source at increased power downrange.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

In accordance with an embodiment, the present invention provides a extended source laser illuminator which incorporates a diffuser that may increase the maximum permissible exposure at the aperture, thereby affording increased light transmission downrange as well as safer light exposure at close range. This invention relates to laser illuminators which can project sufficient light for a glare source at a distance ("downrange") and, at the same time, be eye safe at close range.

Figure 1:
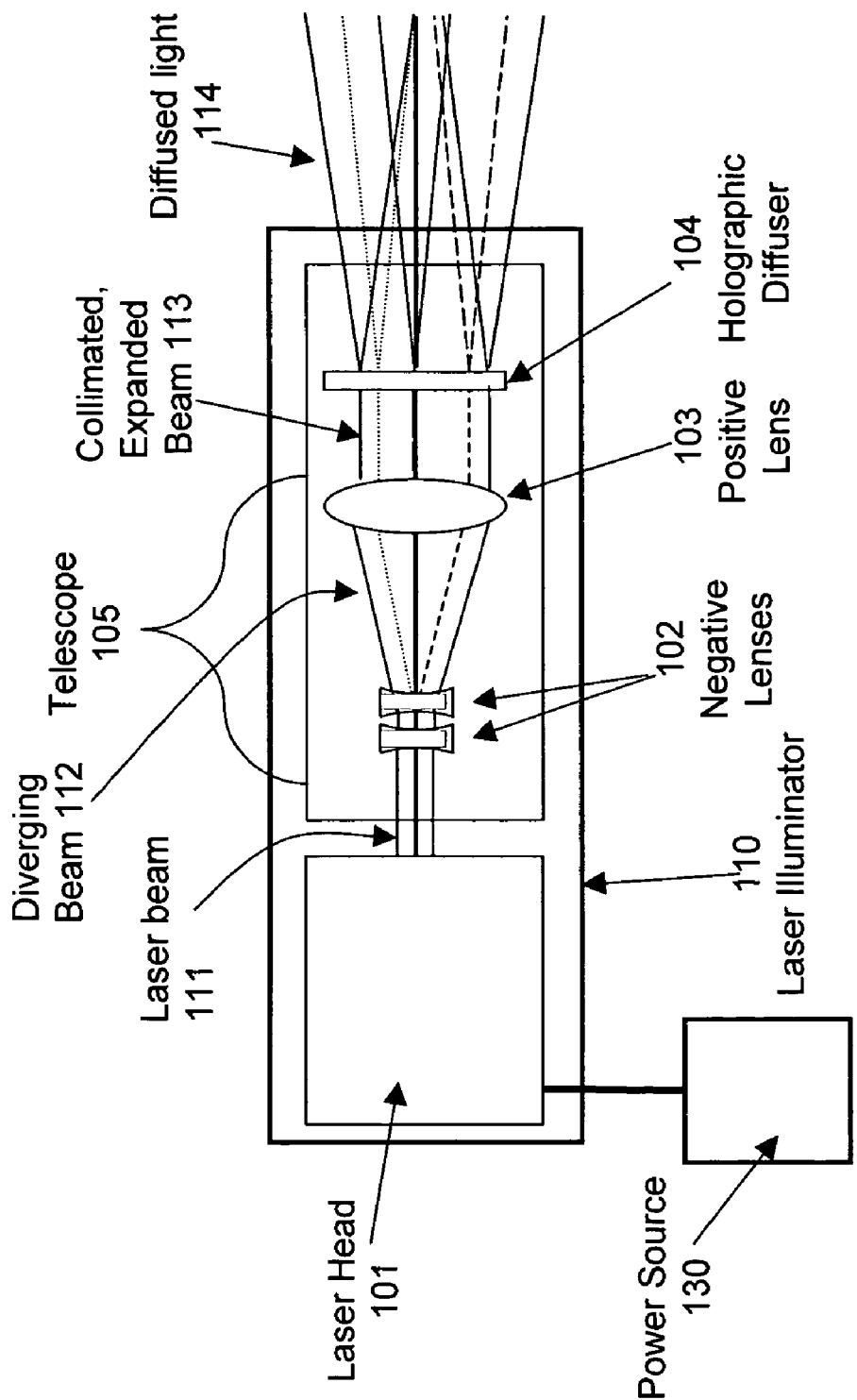
FIG. 1 is a diagrammatic representation of an apparatus in accordance with an embodiment of the present invention.

FIG. 1 is diagrammatic representation of an extended source laser illuminator 110 in accordance with an embodiment of the present invention. As shown in FIG. 1, the laser illuminator 110 may include, for example, a laser head 101, a magnifying telescope 105 and a holographic optical element 104.

The laser illuminator 110 is powered by power source 130. The power source 130 may be located internal to or external to the illuminator 110. The power source 130 may be a battery power source which may use rechargeable batteries and/or non-rechargeable batteries. Additionally or optionally, the power source 130 may receive power from a wall outlet.

The laser head 101 may be any type of laser. For example, the laser head 101 may include a diode laser, diode-pumped solid state laser, solid state laser, a gas laser and/or any class of laser. The laser may output red light, green light or light of other wavelengths. The laser head 101 emits a coherent laser beam 111 into a magnifying telescope 105. The magnifying telescope 105 receives the beam 111 and outputs a collimated expanded light beam 113 to holographic optical element 104.

The magnifying telescope 105 may include a plurality of optical elements. For example, the optical elements may be one or more lenses, prisms, mirrors or other optical elements.

In an embodiment of the invention, the magnifying telescope 105 includes one or more negative lenses 102 and/or at least one positive lens 103. The magnifying telescope may include additional lenses. The one or more negative lenses 102 may be diverging lenses that cause the laser beam 111 to spread out. The positive lens 103 may be a converging lens which produces collimated (i.e., parallel), expanded light beam 113. The surfaces of the various lenses may be plano-concave, double concave or concavo-convex. The collimated expanded light beam 113 output by the magnifying telescope 105 is coherent light.

The collimated expanded light beam 113 is input to the holographic optical element 104. Holographic optical element 104 (e.g., a diffuser, a holographic diffuser, etc.) spreads and diffuses the light beam 113 at a controlled divergence. The holographic optical element 104 outputs incoherent or diffused light 114. The holographic optical element spreads and homogenizes the light so that it is no longer collimated (non-collimated light). However, beam spread is precisely controlled by the holographic optical element 104, maximizing photon efficiency.

The holographic optical element 104 diffuses the collimated expanded light beam 113 so that it covers a larger cross sectional area. The holographic optical element 104 diffuses the collimated expanded light beam 113 at each point on the diffuser at different angles and in different directions, but within a circumscribed cone. The extended source produced by the diffuser 104 creates an extended image on the retina of the eye. The extended retinal image permits a higher power laser exposure, compared to a point source image common in conventional designs. Consequently, the extended source laser illuminator 110, as described herein, may provide a safer, more effective and efficient light source, having a shorter hazard distance than a point light source, which can also be used for general lighting purposes. The extended source laser illuminator 110 may also be used as a search light providing increased light downrange.

Figure 2:
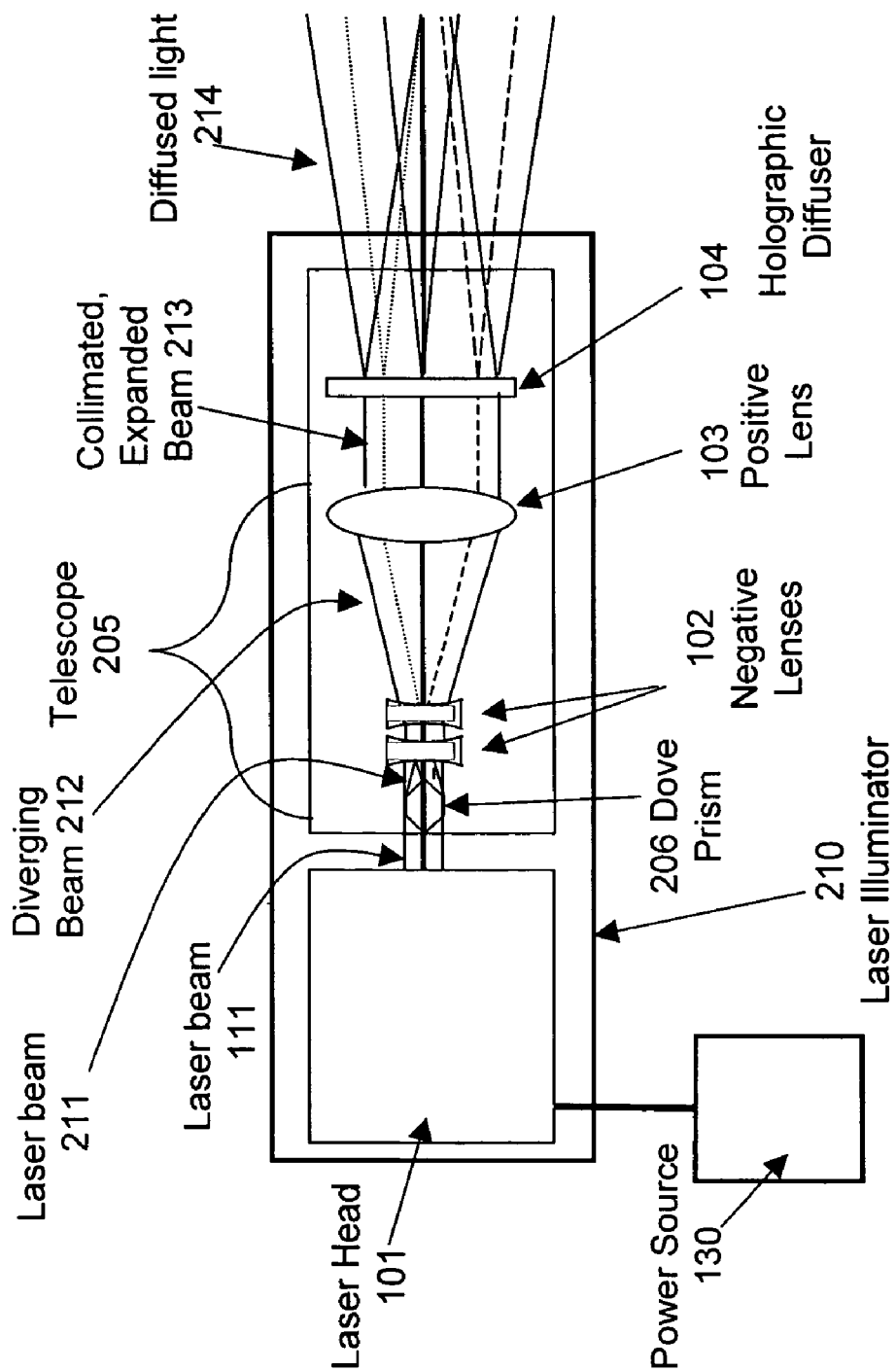
FIG. 2 is a diagrammatic representation of an apparatus in accordance with an embodiment of the present invention.

FIG. 2 shows laser illuminator 210 in accordance with an embodiment of the present invention. As shown, telescope 205 includes at least one prism 206 which may be a dove prism or other type of prism. Prism 206 receives laser beam 111 from the laser head 101 and further decentralizes the laser beam 111 to produce laser beam 211. Laser beam 211 is input to one or more negative lenses 102. The one or more negative lenses 102 cause the laser beam 211 from the prism 206 to spread out and produce diverging beam 212. The positive lens 103 receives beam 212 and produces collimated expanded light beam 213. The collimated expanded light beam 213 output by the magnifying telescope is coherent light. The collimated expanded light beam 213 is input to the holographic optical element 104. Holographic optical element 104 spreads and diffuses the collimated expanded light beam 213 at a controlled divergence, and outputs incoherent or diffused light 214.

The holographic optical element 104 diffuses collimated expanded light beam 213 so that it covers a larger cross sectional area. The holographic optical element 104 (e.g., a diffuser, a holographic diffuser, etc.) diffuses the collimated expanded light beam 213 at each point on the diffuser at different angles and in different directions, but within a circumscribed cone. The extended source produced by the holographic optical element 104 creates an extended image on the retina of the eye. The extended retinal image permits a higher power laser exposure, compared to a point source image common in conventional designs.

The laser illuminators 110 and 210, as described herein, may be used as a safer non-lethal glare source providing a high intensity glare source which can temporarily visually impair an adversary. The non-lethal glare source may have military, police and security applications. For example, the non-lethal glare source may be used for apprehension, crowd control, perimeter defense, and intruder delay and denial. The illuminator provides a glare field which may result in the reduction of visibility to disorient the advisory, and assist in capture.

As described above, holographic optical element 104 also homogenizes the laser beam providing a more effective glare device by distributing the light more evenly, minimizing potentially hazardous hot spots. The holographic diffuser design safely permits the use of higher laser power, extending the effective range of the extended source illuminators 110 and 210 when compared to conventional point source designs. The holographic design may double the effective glare range at night and could also prove to be an effective glare source during the day.

To be considered eye safe, a laser must not exceed the maximum permissible exposure (MPE) at the exit aperture, the opening of the laser where the beam is emitted. The MPE is defined as the level of laser radiation to which a person may be exposed without hazardous effect or adverse biological changes in the eye or skin. Lasers that exceed the MPE must be used with eye protection to avoid the risk of eye injury. Lasers available to the general public are typically limited to low power because of the safety concern. Therefore, the amount of light transmitted downrange will always be limited by the power at the exit aperture. The laser illuminators in accordance with embodiments of the invention may increase the maximum permissible exposure at the aperture, thereby affording increased light transmission downrange.

The laser illuminators, as described herein, provide an extended source which distributes the light over a larger surface area, making it less hazardous to a person's eye. The diffuser 104 diffuses the light over a larger area making the diffused light less hazardous because it is distributed over a larger area on the retina. More energy can be absorbed and dissipated without reaching the burn threshold, so the extended source has a higher maximum permissible exposure ("MPE") than a comparable point source.

The laser illuminators, as described herein, may be in the form of a flashlight, a search light, a vehicle headlight, a pointer and/or any illumination or security device.

Figure 3:
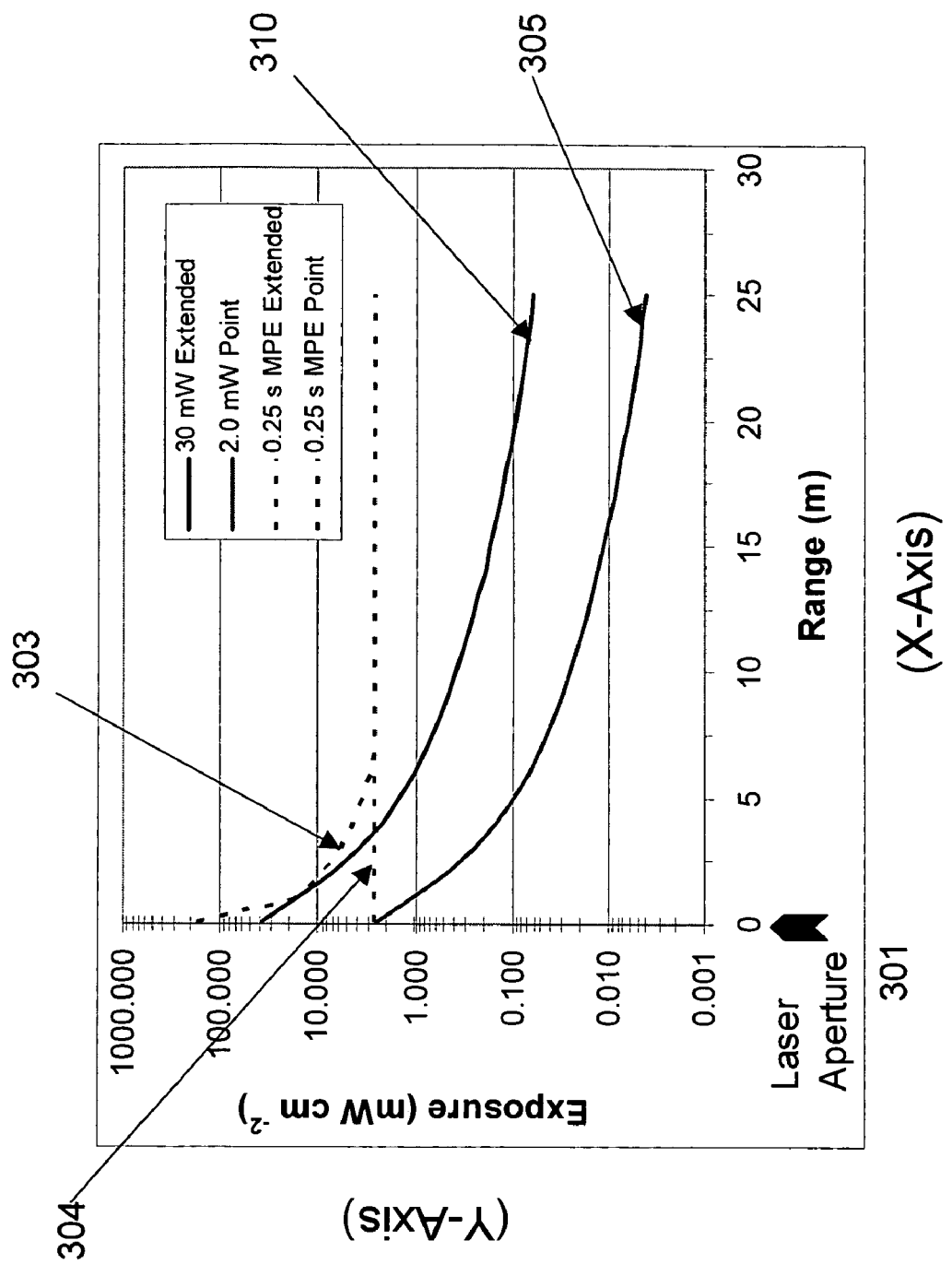
FIG. 3 is a graph showing a maximum permissible exposure and laser intensity for a point and an extended laser source.

FIG. 3 is a graph showing a theoretical MPE curve and beam fluence (laser intensity) for a point source and an extended source laser illuminator (e.g., laser illuminators 110 and/or 210). The power of the laser may be defined beam fluence or intensity measured as power per area per solid angle (e.g., W/m^-steradian). The power can also be described as irradiance measured as power per area (e.g., watt/m^2, milli-watts/cm^2). The graph shows the beam fluence (Y-Axis) versus distance or range (X-Axis). At distance zero (0) 301, the graph shows the beam fluence exiting the laser aperture. As can be seen on the graph, the point source MPE 304 is constant as a function of range. To maintain eye safety along the entire beam path, laser intensity cannot exceed the MPE at the laser aperture. The graph further shows that the point source beam fluence 305 decreases with increasing range. Point source fluence and, consequently, effectiveness are limited by the point source MPE at the laser aperture.

As shown in FIG. 3, the extended source MPE 303, on the other hand, changes as a function of range. The extended source MPE 303 is greater than the point source MPE 304 at the laser aperture. As a viewer approaches the extended source, the MPE 303 increases in direct proportion to the image size on the retina. As can be seen, the extended source beam fluence 310 is higher at the laser aperture and, therefore, results in greater fluence downrange (i.e., as the distance increases). A holographic design that extends the cross-section of the beam by a factor of ten may also increase the eye-safe power limit by a factor of ten. Because of the higher MPE 303 at the laser aperture, an extended source laser illuminator propagates greater intensity along the entire beam path making it a more effective illumination and glare source compared to a point source design. The point source MPE and extended source MPE meet at a range where the effective image size of the extended source reduces to a point source. At this distance the extended source MPE and point source MPE are the same.

Referring again to FIG. 3, FIG. 3 shows an example of how an extended source design allows for the use of a higher power laser without exceeding safety limits. The point source and extended source laser parameters in this hypothetical example use a 1-cm diameter Gaussian beam profile and a 10-mrad divergence. For the point source laser, the beam is essentially composed of parallel light rays. The maximum permissible exposure for the point source laser at the aperture is 2.6 mW cm$^{-2}$ for a 0.25-s exposure (American National Standard for the Safe Use of Lasers, Standard Z136.1, The Laser Institute of America, American National Standards Institute (2000)). The one-cm beam of the extended source passes through the holographic optical element, thereby producing a diffuse source with a higher safety limit at the aperture. The maximum permissible exposure for a 1-cm extended source beam is 173 mW cm$^{-2}$ (ANSI Z136.1-2000). This higher safety limit permits the use of a 30 mW source instead of a 2-mW source. The higher output power results in higher power by a factor of 15 along the entire beam path. At 25 m the irradiance for the point source is 4 µW cm$^{-2}$ compare to 60 µW cm$^{-2}$ for the extended source.

The extended source laser illuminator design (laser illuminators 110 and/or 210), as described herein, can be scaled to large and small applications. The extended range MPE continues to increase as diffuser area increases, providing an increased margin of safety or reduced hazard distance for large scale applications. Because the extended source illuminator design covers a larger cross-sectional area than a point source, it becomes a more effective light source. Thus, the extended source illuminator design can be used in high power applications such as laser search lights and street lights that could provide illumination of a large area over a long distance. A larger spot size also improves pointing and tracking performance. Small scale applications include a household laser flashlight and accent lighting. Furthermore, images can be recorded on the diffuser so that pictures, patterns or words can be projected onto surfaces or directly into the eye.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An apparatus for producing a high brightness illumination or glare source, the apparatus comprising:
   a laser to emit a light beam;
   a magnifying telescope including a negative lens to expand the light beam and a positive lens to collimate the expanded light beam; and
   a holographic diffuser to receive the collimated light beam and to produce a diffused light beam, wherein the diffused light beam has an extended cross section and provides an extended glare source, at increased power, down range and wherein the extended glare source produces a visually impairing glare downrange to impair eyesight.

2. The apparatus of claim 1, wherein the negative lens includes a diverging lens.

3. The apparatus of claim 1, wherein the positive lens includes a converging lens.

4. The apparatus of claim 1, wherein the extended glare source produces a reduction in visual ability.

5. The apparatus of claim 1, wherein the diffused light output by the holographic diffuser produces a shorter eye-hazard distance than a point source light.

6. The apparatus of claim 1, wherein the magnifying telescope further comprises:
   a prism to receive the light beam from the laser and provide an output to the negative lens.

7. The apparatus of claim 1, wherein the diffused light output by the holographic diffuser has a uniform and wide area of illumination.

8. The apparatus of claim 1, wherein the diffused light output by the holographic diffuser is non-collimated light.

9. The apparatus of claim 1, wherein the diffused light output by the holographic diffuser is within a circumscribed cone.

10. An apparatus comprising:
    a laser;
    a first optical element to receive a light beam from the laser and to output an expanded light beam;
    a second optical element to receive the expanded light beam and to output a collimated light beam; and
    a diffuser to diffuse the collimated light beam, wherein the diffuser distributes the collimated light beam to produce an extended cross section glare source and the extended glare source produces a reduction in visual ability and produces a visual glare to impair eyesight.

11. The apparatus of claim 10, wherein the first and second optical elements are prisms.

12. The apparatus of claim 10, wherein the first optical element is a negative lens.

13. The apparatus of claim 10, wherein the second optical element is a positive lens.

14. The apparatus of claim 10, wherein the first and second optical elements comprise a magnifying telescope.

15. The apparatus of claim 10, wherein a distributed non-collimated light output by the diffuser produces a higher maximum permitted exposure and a shorter eye-hazard distance.

16. A method of producing a visually impairing glare source comprising:
    expanding a laser beam using a diverging optical element;
    collimating the expanded laser beam using a converging optical element; and
    diffusing the collimated laser beam using a diffuser to produce the visually impairing glare source at an extended range, wherein light output from the diffuser is distributed over a large area of a retina inside an eye to impair eyesight.

17. The method of claim 16, wherein the distributed light minimizes hotspots on the eye.

18. The method of claim 16, further comprising:
    outputting non-collimated light by the diffuser, wherein the non-collimated light is output at different angles and in different directions, within a circumscribed cone.

19. An apparatus for producing a high brightness illumination or glare source, the apparatus comprising:
    a laser to emit a light beam;
    a magnifying telescope including a negative lens to expand the light beam and a positive lens to collimate the expanded light beam; and
    a holographic diffuser to receive the collimated light beam and to produce a diffused light beam, wherein the diffused light beam has an extended cross section and provides an extended glare source to impair eyesight.

20. The apparatus of claim 19, wherein the extended glare source produces a visually impairing glare downrange.

21. The apparatus of claim 19, wherein the negative lens includes a diverging lens.

22. The apparatus of claim 19, wherein the positive lens includes a converging lens.

23. The apparatus of claim 19, wherein the magnifying telescope further comprises:
    a prism to receive the light beam from the laser and provide an output to the negative lens.

* * * * *